(12) United States Patent
Wu

(10) Patent No.: US 7,751,154 B2
(45) Date of Patent: Jul. 6, 2010

(54) MAGNETIC RECORDING HEADS WITH BEARING SURFACE PROTECTIONS AND METHODS OF MANUFACTURE

(75) Inventor: Andrew L. Wu, Shrewsbury, MA (US)

(73) Assignee: Quantum Corporation, San Jose, CA (US)

( * ) Notice: Subject to any disclaimer, the term of this patent is extended or adjusted under 35 U.S.C. 154(b) by 366 days.

(21) Appl. No.: 11/133,493

(22) Filed: May 19, 2005

(65) Prior Publication Data

US 2006/0262439 A1 Nov. 23, 2006

(51) Int. Cl.
*G11B 5/33* (2006.01)
*G11B 5/147* (2006.01)

(52) U.S. Cl. ........................ 360/313; 360/321
(58) Field of Classification Search .............. 360/110, 360/313, 324, 320, 321
See application file for complete search history.

(56) References Cited

U.S. PATENT DOCUMENTS

| | | | |
|---|---|---|---|
| 4,130,847 A * | 12/1978 | Head et al. ................. | 360/122 |
| 5,210,667 A | 5/1993 | Zammit | |
| 5,463,805 A | 11/1995 | Mowry et al. | |
| 5,493,467 A * | 2/1996 | Cain et al. .................. | 360/321 |
| 5,544,774 A | 8/1996 | Gray | |
| 5,617,273 A | 4/1997 | Carr et al. | |
| 5,666,248 A | 9/1997 | Gill | |
| 5,710,683 A | 1/1998 | Sundaram | |
| 5,772,493 A * | 6/1998 | Rottmayer et al. .......... | 451/5 |
| 5,896,253 A | 4/1999 | Dirne et al. | |
| 5,991,119 A * | 11/1999 | Boutaghou et al. .......... | 360/234.7 |
| 6,007,731 A | 12/1999 | Han et al. | |
| 6,193,584 B1 | 2/2001 | Rudy et al. | |
| 6,205,008 B1 | 3/2001 | Gijs et al. | |
| 6,219,205 B1 | 4/2001 | Yuan et al. | |

(Continued)

FOREIGN PATENT DOCUMENTS

EP 0 497 403 A1 8/1992

(Continued)

OTHER PUBLICATIONS

Bhushan, B. et al. (Apr. 15, 1996). "Pole Tip Recession Studies of Hard Carbon-Coated Thin-Film Tape Heads," *J. Appl. Phys.* 79(8):5916-5918.

(Continued)

*Primary Examiner*—Brian E Miller
(74) *Attorney, Agent, or Firm*—Roedez & Broder LLP; James P. Broder

(57) ABSTRACT

In one aspect described herein, a read head having one or more magnetoresistive (MR) sensors (or devices) is provided. In one example, the read head includes an MR sensor and an insulator layer disposed at the same level as the MR sensor. The read head further includes a bearing surface, wherein the insulator layer forms a portion of the bearing surface and is disposed between a surface of the MR sensor and the bearing surface to provide protection for the MR sensor from exposure to the bearing surface. The MR sensor may include a stack of thin-film layers to form an AMR, GMR, or TGMR sensor element. The stack may further include a slanted surface portion, wherein the insulator layer is disposed on the slanted surface portion, thereby recessing the MR sensor from the bearing surface.

20 Claims, 7 Drawing Sheets

U.S. PATENT DOCUMENTS

| | | | |
|---|---|---|---|
| 6,266,217 B1* | 7/2001 | Ruigrok et al. | 360/320 |
| 6,275,033 B1 | 8/2001 | Kools | |
| 6,301,084 B1* | 10/2001 | Santini | 360/317 |
| 6,347,983 B1 | 2/2002 | Hao et al. | |
| 6,359,754 B1* | 3/2002 | Riddering et al. | 360/236.6 |
| 6,381,106 B1 | 4/2002 | Pinarbasi | |
| 6,396,670 B1 | 5/2002 | Murdock | |
| 6,433,965 B1 | 8/2002 | Gopinathan et al. | |
| 6,438,026 B2 | 8/2002 | Gillies et al. | |
| 6,504,689 B1* | 1/2003 | Gill et al. | 360/324.2 |
| 6,519,124 B1* | 2/2003 | Redon et al. | 360/324.2 |
| 6,669,787 B2 | 12/2003 | Gillies et al. | |
| 6,678,126 B2* | 1/2004 | Katakura et al. | 360/321 |
| 6,765,770 B2 | 7/2004 | Dee | |
| 7,061,725 B2 | 6/2006 | Seigler | |
| 7,170,721 B2* | 1/2007 | Wu | 360/321 |
| 2001/0026470 A1 | 10/2001 | Gillies et al. | |
| 2001/0040777 A1* | 11/2001 | Watanabe et al. | 360/321 |
| 2002/0012204 A1 | 1/2002 | Boutaghou et al. | |
| 2002/0024780 A1 | 2/2002 | Mao et al. | |
| 2002/0034661 A1 | 3/2002 | Gillies et al. | |
| 2002/0053129 A1* | 5/2002 | Watanuki | 29/603.07 |
| 2002/0118493 A1* | 8/2002 | Kondo et al. | 360/321 |
| 2002/0181165 A1* | 12/2002 | Gill | 360/321 |
| 2002/0181166 A1* | 12/2002 | Gill | 360/321 |
| 2002/0186514 A1* | 12/2002 | Childress et al. | 360/324.2 |
| 2002/0186515 A1* | 12/2002 | Gill | 360/324.2 |
| 2002/0191348 A1* | 12/2002 | Hasegawa et al. | 360/314 |
| 2003/0002230 A1 | 1/2003 | Dee et al. | |
| 2003/0002232 A1* | 1/2003 | Dee | 360/324.12 |
| 2003/0035253 A1 | 2/2003 | Lin et al. | |
| 2003/0072110 A1 | 4/2003 | Dee | |
| 2003/0137781 A1* | 7/2003 | Carey et al. | 360/324.2 |
| 2003/0182789 A1 | 10/2003 | Kagotani et al. | |
| 2003/0200041 A1 | 10/2003 | Church et al. | |
| 2003/0206383 A1* | 11/2003 | Meguro et al. | 360/324.12 |
| 2003/0235015 A1* | 12/2003 | Wu | 360/321 |
| 2004/0032696 A1* | 2/2004 | Johnson et al. | 360/317 |
| 2004/0061983 A1* | 4/2004 | Childress et al. | 360/324.2 |
| 2005/0036244 A1 | 2/2005 | Carey et al. | |
| 2005/0105220 A1* | 5/2005 | Iben | 360/323 |
| 2006/0034021 A1 | 2/2006 | Wu | |

FOREIGN PATENT DOCUMENTS

| | | |
|---|---|---|
| EP | 0 498 492 A1 | 8/1992 |
| EP | 0 519 558 A1 | 12/1992 |
| EP | 1 176 585 A2 | 1/2002 |
| EP | 1 376 543 A2 | 1/2004 |
| GB | 2 169 434 A | 7/1986 |
| JP | 62-75924 A | 4/1987 |
| JP | 5-266425 A | 10/1993 |
| JP | 5-334629 A | 12/1993 |
| JP | 7-153036 A | 6/1995 |
| JP | 7-230610 A | 8/1995 |
| JP | 8-153310 A | 6/1996 |
| JP | 11-120523 A | 4/1999 |
| JP | 2001-291214 A | 10/2001 |
| JP | 2001-338409 A2 | 12/2001 |

OTHER PUBLICATIONS

Patton, S. T. et al. (1996). "Micromechanical and Tribological Characterization of Alternate Pole Tip Materials for Magnetic Recording Heads," *Wear* 202(1):99-109.

European Search Report (Partial) mailed on May 30, 2008, for European Patent Application No. 06252605.8, filed on May 18, 2006, six pages.

* cited by examiner

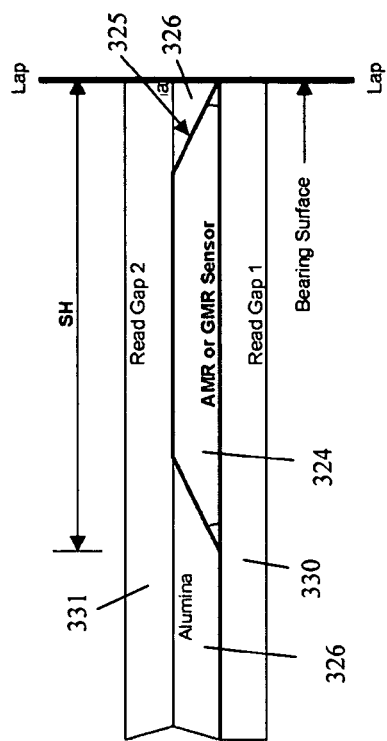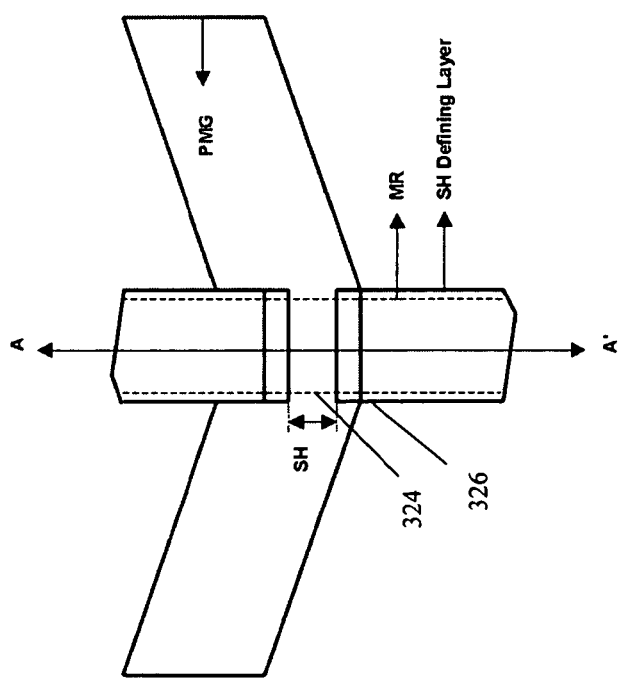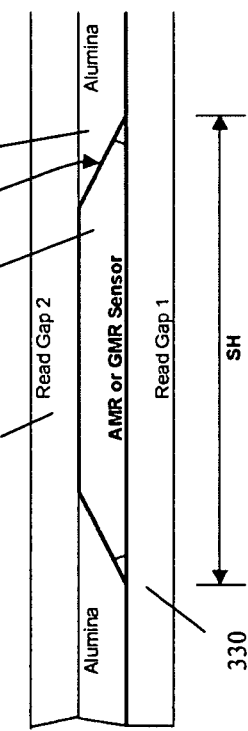
Figure 3A
Figure 3B
Figure 3C

MAGNETIC RECORDING HEADS WITH BEARING SURFACE PROTECTIONS AND METHODS OF MANUFACTURE

BACKGROUND

1. Field

The present invention relates generally to magnetic read and/or write heads and methods of manufacture, and more particularly to magnetoresistive sensors or devices having bearing surface protections and methods of lapping the devices using a reference and monitoring device, and methods of producing high precision stripe height and improved thickness control of the second read gap in magnetoresistive devices.

2. Description of Related Art

Magnetic storage tape continues to be an efficient and effective medium for data storage in computer systems. Increased data storage capacity and retrieval performance is desired of all commercially viable mass storage devices and media. In the case of linear tape recording, a popular trend is toward multi-bump, multi-channel fixed head structures with narrowed recording gaps and data track widths so that many linear data tracks may be achieved on a tape medium of a predetermined width, such as one-half inch width tape. To increase the storage density of magnetic tapes and storage systems, data transducer elements, e.g., magnetoresistive (MR) elements or devices, on the head and data tracks on the tape are arranged with greater density.

Magnetic tape heads typically include an active device region including raised strips or ridges, commonly referred to as islands, bumps, or rails, that provide a raised tape support or wear surface across which the magnetic tape advances. One or more of these raised islands includes embedded data transducers. The embedded transducers can be either a recording device for writing information to a magnetic tape or a reproducing device for reading information from a magnetic tape. An embedded recording device produces a magnetic field in the vicinity of a small gap in the core of the device, which causes information to be stored on a magnetic tape as the tape advances across the support surface. In contrast, a reproducing device detects a magnetic field from the surface of a magnetic tape as the tape advances over the support surface. Additionally, raised islands may be included without transducers to help support and guide the magnetic tape over the head, generally referred to as outriggers.

Typically, a plurality of embedded transducers are spaced transversely across a direction of tape transport. The transducers may be sized and disposed along an island for varying storage tape data formats, e.g., different numbers of channels, track widths, and track densities. For example, a four channel head includes four read and four write transducers spaced transversely across a tape path. The width of the read/write transducers and the distance between adjacent read/write transducers are associated with the density of tracks to be written to and read from the storage tape. Storage capacity of magnetic tapes is generally increased with the use of smaller more closely positioned read/write transducers in the tape head.

As the storage tape and tape drive industry evolves and achieves increases in storage capacity, the tape head and media designs continue to make changes from one generation to the next. For instance, new data formats with more densely positioned read/write transducer elements on tape heads, more densely positioned tracks on the storage tape, and thinner storage tape increases the storage capacity of storage tape devices. For example, to increase storage capacity of storage tape, the storage tape may be thinned, e.g., lower magnetization thickness (Mrt), while narrowing and thinning the MR sensors in the head.

Typical MR sensors for use with magnetic recording heads are manufactured using standard semiconductor type processing methods. For example, multiple rows of magnetic recording transducers are deposited simultaneously on wafer substrates and cut into active device regions for incorporation into a magnetic recording head. After a section of magnetic recording transducers are cut from the wafer, they are subject to a lapping process to reduce the stripe heights of the MR-sensors to a desired height and smooth or polish the surface of the structure. Stripe height is one of the key parameters that control the signal output and device behavior of a magnetoresistive recording head. The stripe height generally determines the sensitivity of the magnetoresistive device to a magnetic field, where a reduction in stripe height typically produces a more sensitive magnetoresistive device. As magnetic recording density increases, scaled down MR sensors, e.g., anisotropic magnetoresistive (AMR), giant magnetoresistive (GMR), or tunneling giant magnetoresistive (TGMR) devices, are used to achieve adequate signal output.

The desire for shorter stripe height leads to a desire for tighter control of stripe height during manufacturing, which is generally accomplished by mechanical lapping using one or more Electronic Lapping Guides (ELGs). It is generally unwise to use the actual MR sensors for monitoring stripe height because of the potential for electrostatic discharge during the lapping process, which may damage the device. In the manufacture of typical multi-channel tape heads on a wafer, for example, a pair of ELGs is disposed at each end of a cluster of MR sensors. The ELGs are monitored during manufacturing to determine the stripe height of the active MR sensors of the cluster. For example, the lapping process is controlled to cease when the ELG resistance reaches a calculated value associated with a desired stripe height of the MR sensors. The calculated ELG resistance, however, is subjected to variations in the geometry and material thickness of the ELG devices, which may result in large cluster-to-cluster stripe height variations.

Additionally, certain materials in MR sensors (and in particular, GMR and TGMR sensors) exposed on the head surface (also known as the air bearing surface or "ABS" with respect to disk drive heads, and the tape bearing surface or "TBS" with respect to tape drive heads) may be prone to corrosion, making heads which utilize MR sensors extremely sensitive to corrosion in the environments in which they are expected to operate. Disk drive heads, which operate in an environment sealed at the factory in clean room conditions, are less susceptible to corrosion than tape drive heads, which must operate while exposed to an often quite harsh ambient atmosphere. Also, typically the ABS of the disk drive head is coated with a thin protective film, which is hard and wear resistant on the air bearing surface of a disk drive head. Unfortunately, the nature of tape recording makes conventional protective overcoats a poor solution for tape drive heads because tape recording involves contact between the tape and head, and the surface of the tape is more abrasive than that of a disk. Consequently, a thin protective film generally wears away leading to degradation of the sensor materials and device performance. In the case of TGMR sensors, which typically replace a copper spacer with an ultra-thin insulator spacer (e.g., 7-9 Å), smearing across the insulator spacer during use may destroy the tunneling effect and render the TGMR sensor non-functional.

BRIEF SUMMARY

In one aspect described herein, a read head having one or more magnetoresistive (MR) sensors (or devices) is provided. In one example, the read head includes an MR sensor and an insulator layer disposed at the same level as the MR sensor. The read head further includes a bearing surface, wherein the insulator layer forms a portion of the bearing surface and is disposed between a surface of the MR sensor and the bearing surface to provide protection for the MR sensor from exposure to the bearing surface. The MR sensor may include a stack of thin-film layers forming a giant magnetoresistive sensor element, a tunneling giant magnetoresistive sensor element, or an anisotropic magnetoresistive sensor element. The stack may further include a slanted surface portion, wherein the insulator layer is disposed on the slanted surface portion, thereby recessing the MR sensor from the bearing surface.

Further, in one example, a read head includes a plurality of MR devices and a pair of electronic lapping guides including a monitoring device and a reference device, wherein the monitoring device and the reference device are used during a material removal process (e.g., mechanical lapping) to form the bearing surface at a desired distance from the MR sensor.

According to another aspect, a method for manufacturing a magnetoresistive sensor is provided. In one example, the method includes forming a thin-film stack over a read gap layer, the thin-film stack forming the MR sensor. A portion of the thin-film stack is then removed to define a stripe height of the MR sensor and form a slanted surface. An insulating layer is disposed at the same level as the thin-film stack to protect the exposed elements on the slanted surface from corrosions by the chemicals used during a subsequent liftoff operation and to provide a planar surface for the subsequent high precision photolithographic steps. The structure is then lapped to form a bearing surface adjacent the slanted surface of the MR sensor. In particular, the structure is lapped such that the insulating material is disposed between the slanted surface of the thin-film stack and the bearing surface.

Further, in one example, a method includes eliminating or minimizing oxide encroachment into the active device region so that a precisely targeted and uniform second read gap layer is formed over the MR sensor and asymmetry control is maintained. In one example, the Permanent Magnet (PMG) layer is spaced away from the stripe height layer to reduce or eliminate oxide encroachment into the thin-film stack of the MR sensor. As a result, a more uniform second read gap with a targeted thickness may be achieved.

Further, in one example, the method includes forming a plurality of magnetoresistive devices, a reference device, and a monitoring device, where the reference device includes a stripe height less than the monitoring device. Material is removed from a bearing surface, e.g., by lapping, thereby reducing the stripe height of the monitoring device. A characteristic of the reference device, e.g., resistance, voltage, or the like, is compared with a characteristic of the monitoring device, wherein the characteristic of the monitoring device varies as material is removed from the surface. Material may be removed from the surface until the characteristic of the monitoring device and the reference device are substantially equal or within desired tolerances, at which time, the material removal process may be ceased.

The reference device may be formed with a similar stripe height of the magnetoresistive devices and serve as a proxy for the stripe height of the magnetoresistive devices. The reference device may further include a budget or additional stripe height to accommodate a protective layer or material over the magnetoresistive devices, which is intended to remain after the material removal process. The reference device and monitoring device may be formed on the same level and through the same processing steps as readers of the magnetoresistive devices, thereby reducing differences with different processing levels and steps.

Various aspects and examples are better understood upon consideration of the detailed description below in conjunction with the accompanying drawings and claims.

BRIEF DESCRIPTION OF THE DRAWINGS

FIGS. 3A-3C illustrate top and cross-sectional views of an exemplary wafer defined stripe height MR sensor including a protective layer associated with the MR sensor;

DETAILED DESCRIPTION

Figure 1:
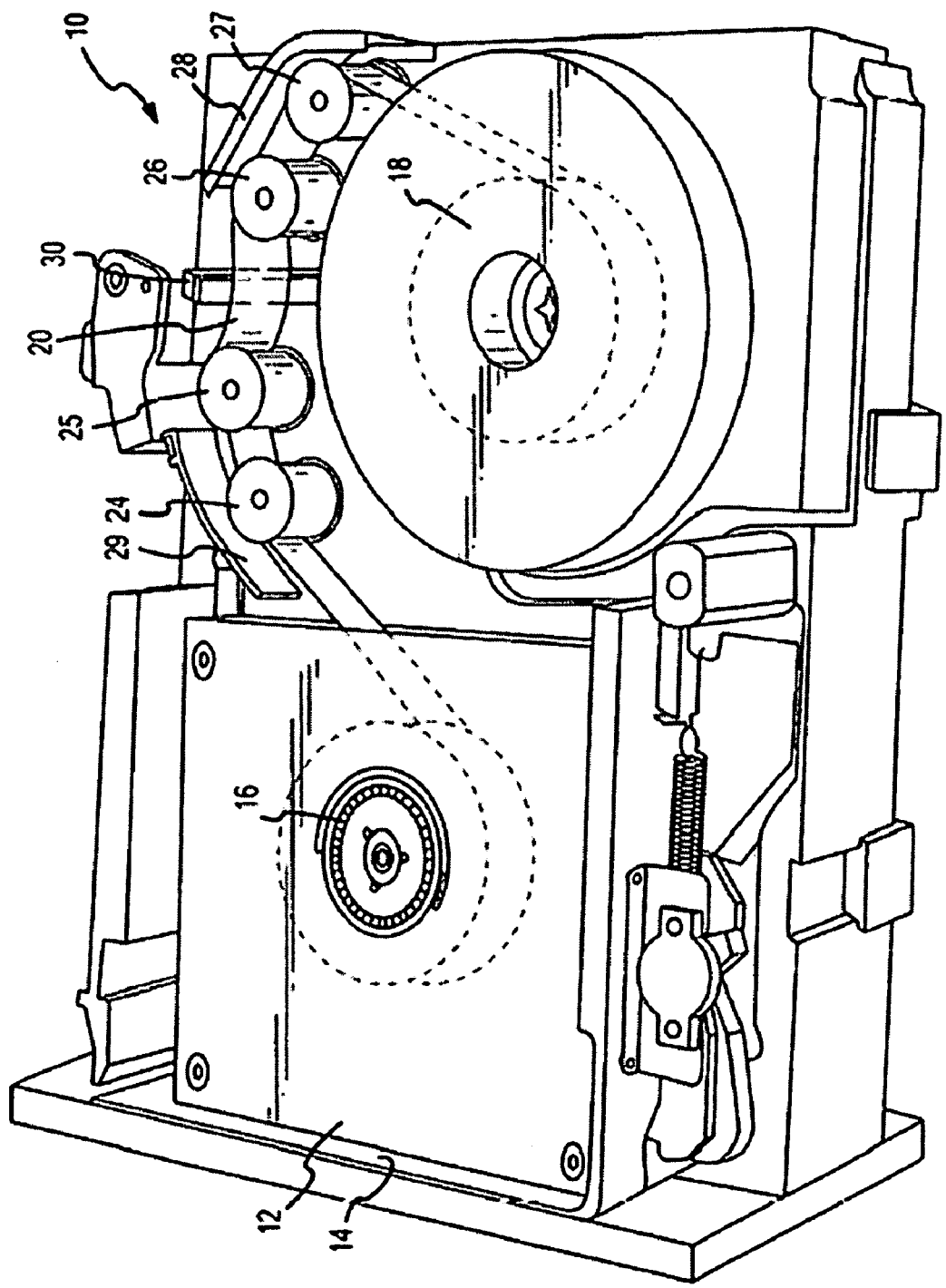
FIG. 1 illustrates an exemplary tape drive system.

Exemplary MR sensors and associated methods of manufacturing MR sensors are provided. The following description is presented to enable any person of ordinary skill in the art to make and use the exemplary methods and associated devices. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention and its various aspects are not intended to be limited to the examples described and shown, but is to be accorded the scope consistent with the appended claims.

Scaled down MR sensors or elements, e.g., AMR or GMR sensors, are desired for higher magnetic recording density. As MR sensors scale down, the stripe height of the MR sensors is scaled down accordingly. Conventional stripe height control using mechanical lapping and calculated Electronic Lapping Guide (ELG) resistance to stop lapping often results in cluster-to-cluster stripe height variations and accuracies on the order of 2,000 Å or greater. Accordingly, exemplary methods described herein may provide improved control over the stripe height of MR sensors, thereby allowing, for example, the manufacture of smaller, more densely positioned MR sensors. In one example, the stripe height control is on the order of 500 Å or less.

Additionally, as higher recording density is desired, the use of GMR or TGMR sensors as opposed to AMR sensors has become more prevalent. GMR or TGMR sensors generally include materials on the bearing surface that are prone to corrosions; for example, materials including copper (e.g., copper spacer), cobalt iron (e.g., dusting layer and pinned layer), and IrMn and PtMn (e.g., antiferromagnetic "AFM" layers). For use in disk drives, e.g., a hard wear resistant overcoat such as Diamond-Like Carbon (DLC) coating or the like may be used to protect the ABS from corrosion. Use with magnetic tape applications, and other "contact" recording applications, the abrasiveness of the magnetic tape wears out the protective coatings resulting in possible corrosion of the MR sensor. Accordingly, examples described herein may provide a bearing surface protection in magnetic recording heads to prevent deleterious exposure and corrosion of the device materials. Additionally, in the case of TGMR, the bearing surface protection may prevent or eliminate smearing of the insulator spacer (which could render the device non-functional).

One exemplary manufacturing method described herein includes depositing an MR layer using semiconductor processing steps to define the stripe height (as opposed to mechanical lapping, for example), where the MR layer further includes a slanted or angled surface portion. For example, an ion milling process may be carried out to remove a portion of the MR layer, resulting in a slanted surface of the MR layer adjacent the edge of a photoresist layer. A thin insulating layer such as alumina may be deposited after ion milling over the underlying layer and the slanted surface of the MR layer. The structure may then be mechanically lapped or polished to define a bearing surface and leave a portion of the insulating layer over the slanted portion of the MR layer, thereby protecting the MR sensor from the bearing surface. Further, a head may include multiple MR sensors as well as an MR reference device and monitoring device to provide a guide for lapping.

The following discussion describes examples as being particularly useful as part of a linear tape drive system utilizing magnetoresistive tape heads for performing read and write operations on magnetic storage media (such as magnetic particle tape). It will be understood, however, that the various examples may be useful with other magnetic storage media and devices such as hard disks, floppy disks, and the like. Accordingly, the exemplary manufacturing methods and devices may be directed to and utilized in various magnetic storage devices and systems.

FIG. 1 illustrates a cut-a-way view of an exemplary magnetic tape drive 10 in which exemplary tape heads and MR sensors as described herein may be used. The particular arrangement of tape drive 10 is provided for completeness of the operating environment for exemplary tape heads and to facilitate description of how exemplary tape heads may be utilized during operation of a tape drive. Tape drive 10 includes a tape cartridge 12 inserted into a receiver 14. Tape drive 10 includes a motor (not shown) which drives a cartridge supply reel 16 and moves tape 20 at a particular speed (e.g., 120 inches per second or more). Tape drive 10 may also include a second motor (not shown) which drives a take-up reel 18. Tape 20 may be driven in either a forward direction or a reverse direction to write data onto or read data from the tape as controlled by a motor controller circuit (not shown in FIG. 1, but typically provided on one or more printed circuit boards). The controller may also be adapted for controlling magnitudes of read/write currents passed through head 30, e.g., to select particular read/write elements for particular data formats and data tracks. Tape 20 is guided through tape drive 10 by a plurality of tape guide assemblies 24-29 between the take-up reel 18 and the cartridge 12 and past tape head 30.

Figure 2:
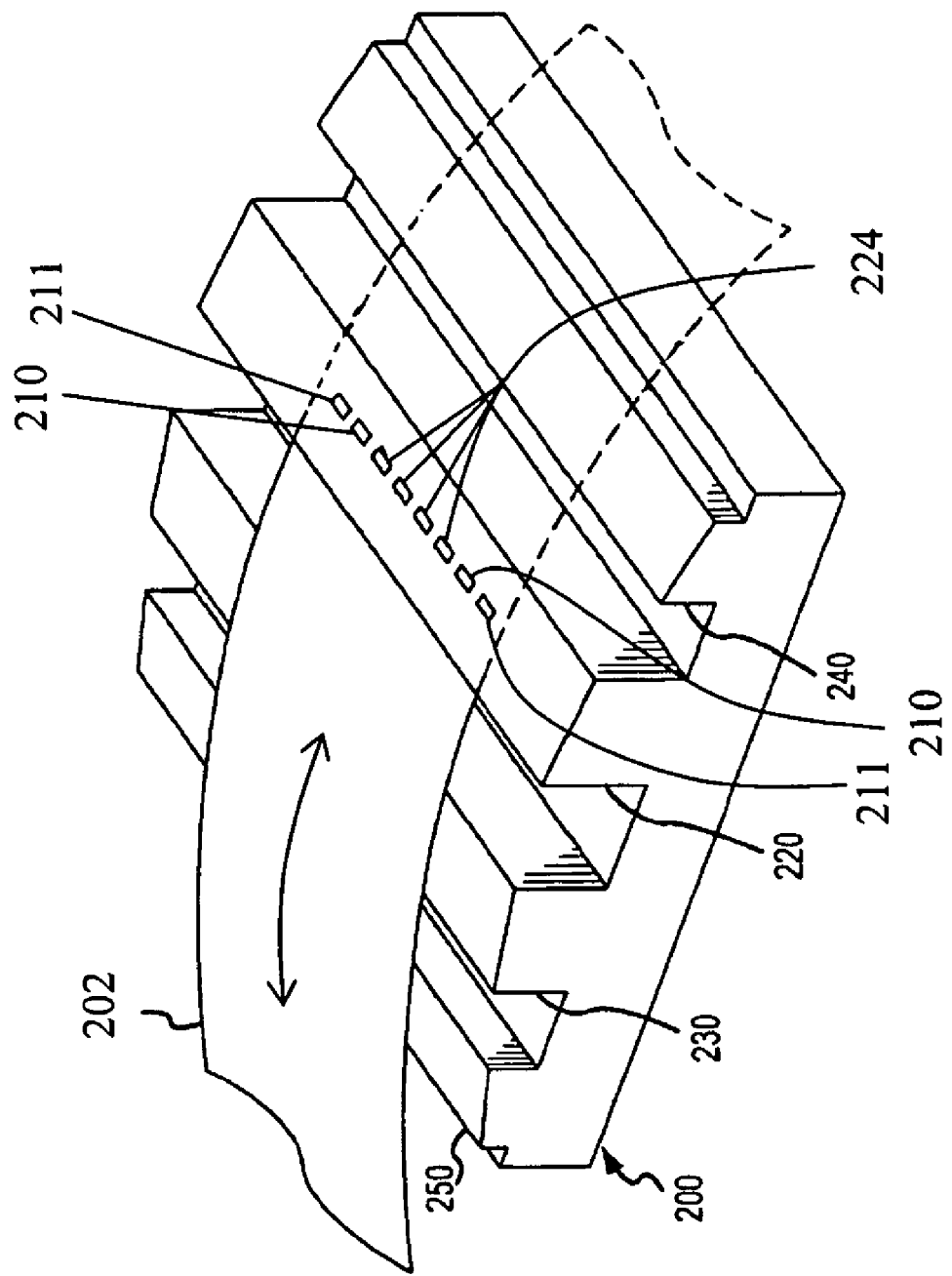
FIG. 2 illustrates an exemplary magnetic recording head including a plurality of MR sensors.

FIG. 2 illustrates a perspective view of an exemplary tape head 200 including raised elongated bumps or islands 220, 230, 240, and 250, which may be used in a digital linear tape drive similar to drive 10 of FIG. 1. Included along raised islands 220 and 230 are data transducers or MR sensors 224 (shown only along island 220) arranged transversely to the direction of tape transport to enable reading from or writing to tape 202. Additionally, a monitoring device 210 and reference device 211 are included adjacent MR elements 224, which were used during manufacturing tape head 200 as described herein. As shown, tape head 200 is adapted for contacting media, such as magnetic particle tape 202 that typically has a width ranging from 5 to 20 millimeters.

The fabrication of exemplary tape heads having MR elements/devices and including (and/or manufactured with) ELGs may be manufactured utilizing any of a number of suitable wafer/semiconductor processing techniques. For example, thin-film heads, such as head 200 shown in FIG. 2, are fabricated in clean rooms using vacuum or physical vapor deposition methods (such as RF or DC magnetron sputtering, RF or DC diode sputtering, RF or DC triode sputtering) and ion beam deposition, batch photolithographic methods (such as photoresist masking, coating, and developing), chemical assisted and reactive ion-beam etching, photoresist stripping and etching that allow for very small head and element dimensions and precise positioning and alignment of multiple transducer elements (such as MR sensors 224).

The slots or separation of the islands 220 and 240 can be achieved using laser trimming, precision grinding, or other machining techniques. Each island, such as island 220 or 240, may be fabricated by encapsulating layers of materials within two or more substrate materials followed by lapping or fine polishing to achieve a desired media contact contour and surface. Alternatively, each island may be fabricated of several segments or portions that are then epoxy-bonded together to create the elongated islands. The media contact surface may be coated with a corrosion or wear resistant layer to protect the read/write elements.

The resulting active island generally includes the MR sensors, which include a stack of thin layers of different materials (such as metal alloys and insulating materials). The tape head may be configured to be a thinfilm inductive head, a thinfilm AMR head, a dual MR head, an integrated thinfilm inductive write and MR or GMR read head, or other thinfilm head design such as TGMR. Additionally, inactive islands or outriggers may be fabricated in a similar fashion to the active islands using similar materials or using different materials. Alternatively, inactive islands may be bonded to the head and formed in differing thinfilm processes.

FIGS. 3A-3C illustrate top and cross-sectional views of an exemplary stripe height ("SH") defining layer prior to and after lapping according to one example. In particular, FIGS. 3A and 3B illustrate an MR sensor 324 and associated structure prior to lapping and FIG. 3C illustrate the MR sensor 324 and associated structure after mechanical lapping to define a bearing surface. The stripe height of the MR sensor 324 is defined by wafer processing steps as more fully described with reference to FIGS. 4A-4F. Generally, defining the stripe height with wafer processes (e.g., photolithography steps) is more accurate and precise than less controllable post-wafer mechanical lapping.

MR sensor 324 generally includes a thin-film stack of layers positioned between read gap layers 330 and 331. MR sensor 324 may include any of a plurality of MR-type sensors, including, but not limited to, top or bottom spin valve GMR, AMR, synthetic-antiferromagnet (SAF) GMR, spin tunneling, and tunneling junction GMR (TGMR). Also, the MR sensor may operate in a current-in-the plane (CIP) mode or current-perpendicular-to-the-plane (CPP) mode. The number of thin-film layers and the make-up of each layer may be varied depending on the particular application and design considerations. For example, insulating layers (such as alumina) and top and bottom layers or magnetic poles of cobalt-zirconium-tantalum (CZT), may be included. Poles and shields fabricated using at least one of cobalt, nickel, and iron may also be included. The base substrate upon which the MR sensor is layered may be ferrite, aluminum oxide titanium carbide (AlTiC) or other materials.

MR sensor 324 is further characterized, in part, by a slanted surface 325 at either end of the stripe height (as viewed in the cross-sectional views), where the slanted surface 325 may be defined by a wafer processing step (e.g., a material removal process). MR sensor 324 further includes an insulator layer 326 at the same level (e.g., between read gap 330 and read gap 331) as MR sensor 324 and disposed over the slanted surface 325. In one example, slanted surface 325 may have an angle in the range of 5-30 degrees, but other angles are possible depending on the particular application and processing methods.

FIG. 3C illustrate MR sensor 324 after a mechanical lapping process to define and smooth a bearing surface. In this example, the mechanical lapping process is performed to define the bearing surface just beyond the edge of the MR sensor 324 and slanted portion 325, such that MR sensor 324 is recessed from (and not exposed to) the bearing surface and protected by a portion of insulator layer 326. For example, MR sensor 324 may be recessed at a minimum distance (e.g., at the tip of the slanted region) from the bearing surface by approximately 100-400 Å. In one example, the minimum recessed distance of the tip of slanted portion 325 is manufactured within a ±500 Å tolerance, which is achievable, for example, from the use of reference and monitor lapping guides (as discussed in greater detail below).

Figure 4A:
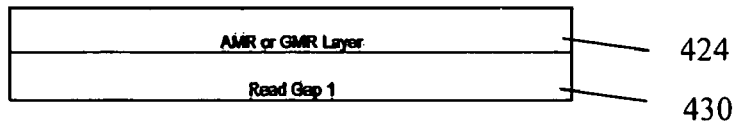
FIGS. 4A-4F illustrate an exemplary method for forming MR sensors similar to that illustrated in FIGS. 3A and 3B.

FIGS. 4A-4F illustrate an exemplary method for forming a structure including an MR sensor similar to that shown in FIGS. 3A-3C. Initially, an MR layer 424 is deposited on a read gap layer 430 as shown in FIG. 4A. Read gap layer 430 may include alumina or other suitable material(s). Further, MR layer 424 may include a multilayer "stack" of various individual layers such as a cap layer, pinned layer, spacer layer, free layer, buffer layer, and the like to form an AMR, GMR, or TGMR sensor as is known in the art. Additionally, copending U.S. patent application Ser. No. 10/183,329, entitled "Method of Producing Flux Guides in Magnetic Recording Heads," filed Jun. 24, 2002, which is incorporated herein by reference in its entirety, describes exemplary GMR sensors and associated layers that may be included in MR layer 424.

Figure 4B:
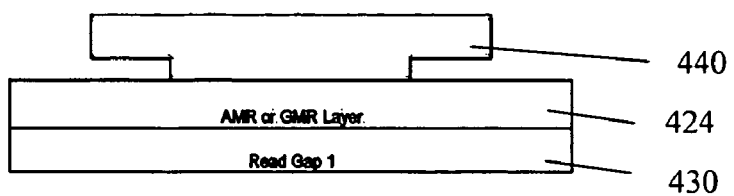

With reference to FIG. 4B, a photoresist 440 is patterned over MR layer 424 as shown. In this example, photoresist 440 includes a T-shaped image reversal or bi-layer photoresist patterned after the deposition of MR layer 424 atop read gap 430. Ion milling (or other suitable material removal or etching process) is performed to remove a portion of MR layer 424 in FIG. 4C, thereby defining the stripe height of the MR sensor. As noted herein, the stripe height of the final MR sensor is therefore defined by a semiconductor processes (in this example, the photolithography step) and may control the stripe height more accurately and consistently than conventional methods (e.g., mechanical lapping).

Figure 4C:
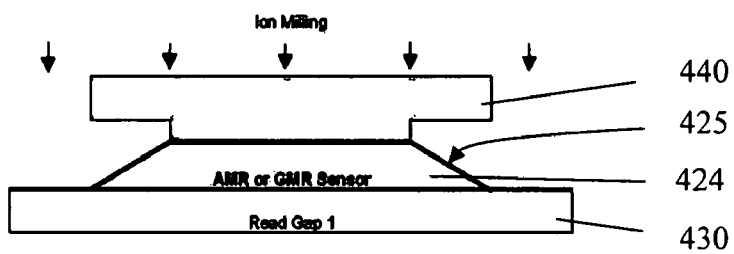

The ion milling further results in a slanted or sloped surface 425 in the MR layer 424 as shown. The amount of recession from the bearing surface of the final MR sensor depends, at least in part, on the angle of the sloped surface 425 and various film thicknesses of MR layer 424. For example, a typical synthetic bottom spin-valve PtMn GMR stack may include a recession ranging from 750 Å to 2440 Å as the angle of the slope varies from approximately 30 degrees to 10 degrees. Of course, various other ranges of the slope and recession are possible. Further, other methods of removing or depositing materials of MR layer 424 to have a particular stripe height and cross-sectional profile shape, including sloped surface 425, similar to that of FIG. 4C are possible and contemplated.

In another example, MR layer 424 may be over etched into read gap layer 430. Etching into read gap layer 430 may provide an in situ re-deposition onto slanted surface 425 after etching and may also increases the amount of recession from the bearing surface. Both of these features may benefit surface protection aspects of the manufactured MR sensor.

Figure 4D:
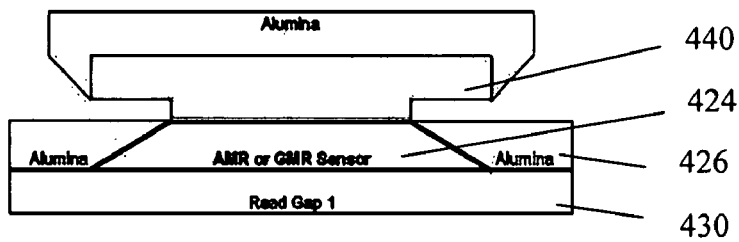

With regard to FIG. 4D, an insulator layer 426, in this example, an alumina layer, is deposited over the read gap layer 430 and slanted surface 425 of MR layer 424. Insulator layer 426 may be deposited by any suitable method and is deposited to back-fill the removed portion of MR layer 424 with insulating material such as alumina, silicon dioxide, or other suitable insulating material(s).

Figure 4E:
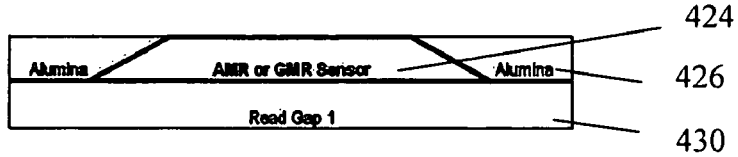
Figure 4F:
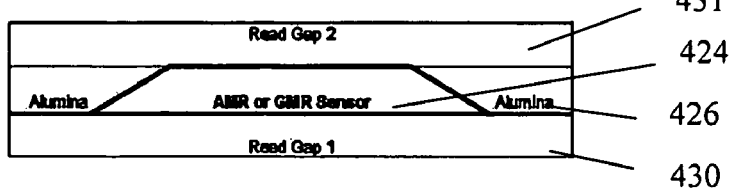

Photoresist 440 is then removed in FIG. 4E, followed by deposition of a second read gap layer 431 over MR layer 424 and insulator layer 426 as shown in FIG. 4F. In this example, the T-shaped profile of photoresist 440 allows for a solvent to attack photoresist 440 and liftoff MR layer 424. The back-filling insulator layer 426 may further protect exposed elements in MR layer 424 on slanted surface 425 from corrosion by chemicals used in the liftoff process. Insulator layer 426 also provides a planar surface for subsequent high precision photolithographic steps. Additionally, by spacing the PMG-defining layer (see FIG. 3A) away from the SH-defining layer at a suitable distance, oxide encroachment into MR layer 424 can be eliminated or minimized such that uniform and targeted thickness of second read gap 431 can be achieved and asymmetry control from field imaging effects related to the second read gap maintained. For example, asymmetry is related to device performance, and generally a slight negative asymmetry is desired for an AMR device. Accordingly, improved control over the thickness and uniformity of the second read gap 431 may improve final device characteristics.

The structure shown in FIG. 4F may then be cut from the wafer and mechanically lapped to a structure similar to that shown in FIG. 3C, where insulator layer 426 protects the MR sensor of MR layer 424 from a bearing surface. As described above, material may be removed to define a bearing surface such that the material of MR layer 424, forming the MR sensor, is recessed (e.g., from 750 Å to 2440 Å) from the bearing surface.

The method of mechanical lapping to define the bearing surface may be assisted with the use of a monitoring device and reference device as described with reference to FIGS. 5A-5C. Similar designs and methods are described, for example, in copending U.S. patent application Ser. No. 10/917,782, entitled "METHODS FOR MANUFACTURING MAGNETIC HEADS WITH REFERENCE AND MONITORING DEVICES," filed Aug. 13, 2004, the entire content of which is hereby incorporated by reference as if fully set forth herein.

According to one example, traditional ELGs are included at both ends of a cluster of MR sensors and are used to balance lapping at the beginning of a lapping process. When lapping is balanced, further fine lapping using two ELGs, an ELG-Reference device (ELG-R) and an ELG-Monitoring device (ELG-M) disposed proximate the active MR sensors is performed. In one example, the stripe height of all the MR sensors and the ELG-R are defined by wafer processes, e.g., as described herein. The stripe height of the ELG-M is formed to be greater than the stripe height of the MR sensors and the ELG-R. A characteristic, e.g., resistance, of the ELG-M and ELG-R is monitored and lapping ceased when the resistance of ELG-M reaches a predetermined value in relation to ELG-R, e.g., the same value as ELG-R. The exemplary lapping process using an ELG-R and ELG-M may provide lapping control within ±500 Å accuracy.

Figure 5A:
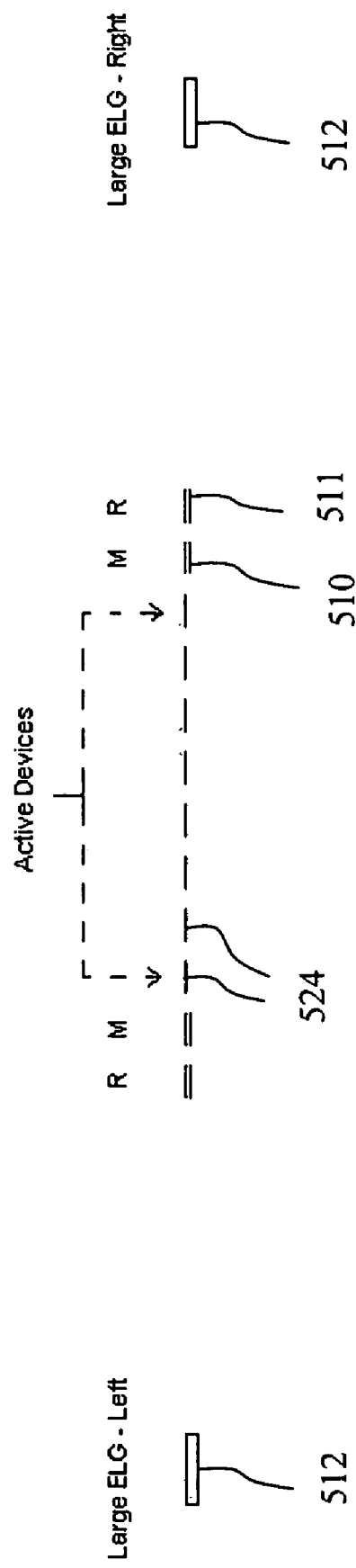
FIG. 5A-5C illustrate an exemplary configuration of MR sensors and ELGs (including a monitoring device and reference device) according to one example.
Figure 5B:
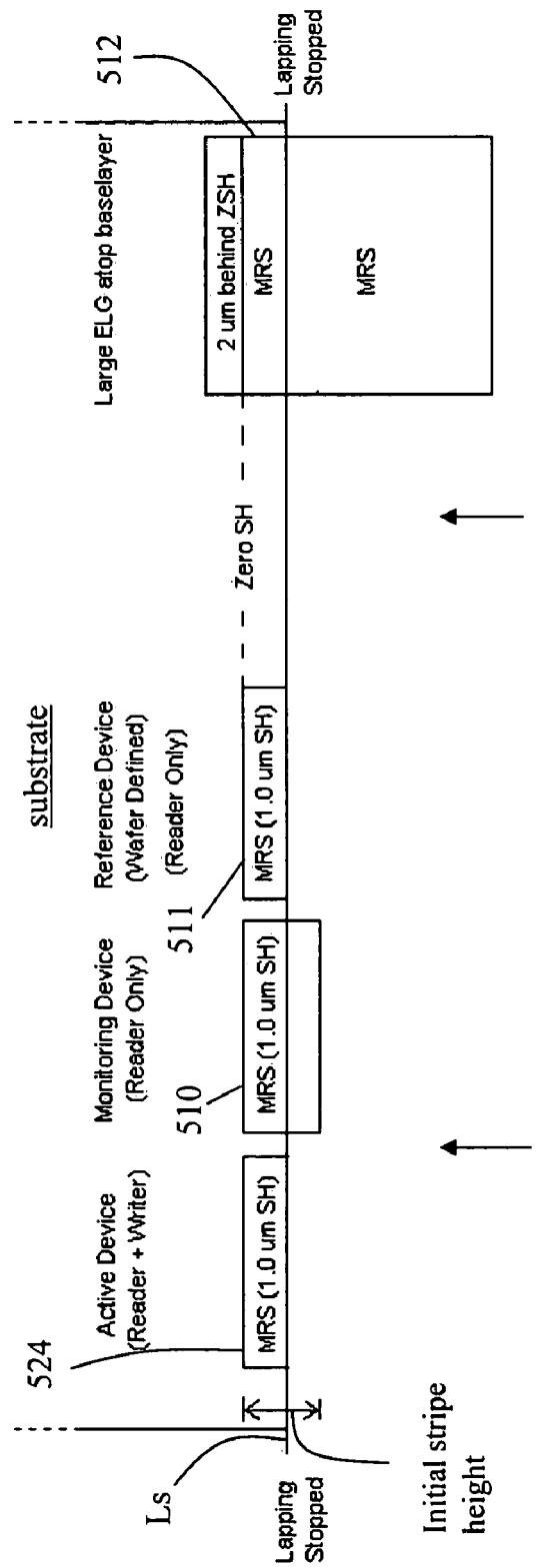
Figure 5C:
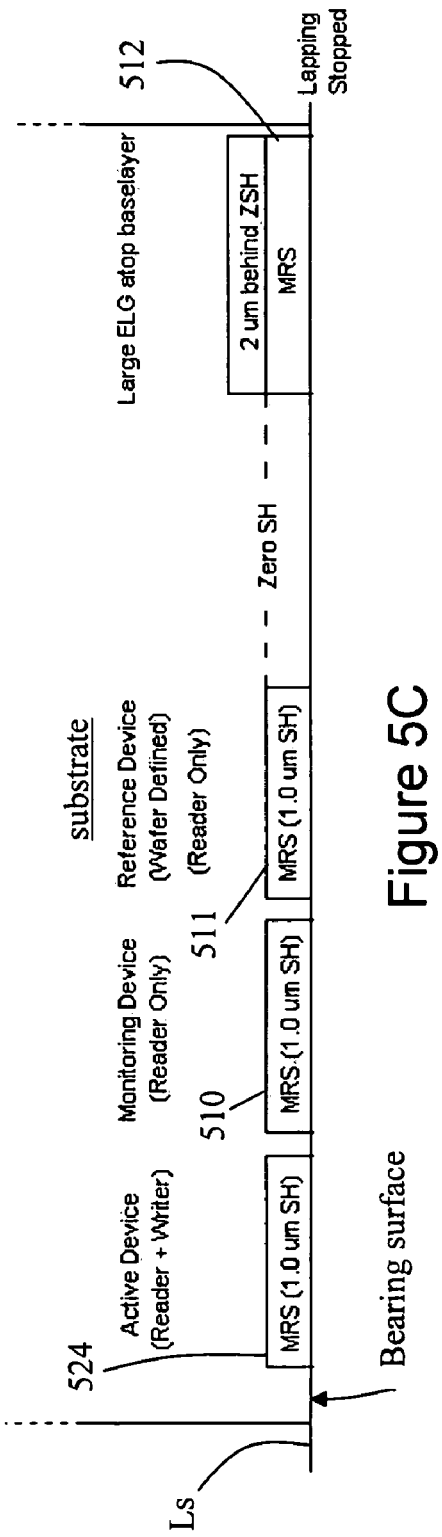

FIGS. 5A-5C illustrate top views of an exemplary configuration of active MR sensors 524 and ELGs. In this example, the ELGs include at least one pair of devices, a monitoring device 510 (ELG-M) and a reference device 511 (ELG-R), located proximate active devices 524, and a large ELG 512 at both ends of the cluster of active devices 524. Generally, large ELGs 512 are used to balance the initial lapping (or rough lapping) of the structure to level the surface for subsequent lapping processes. The reference device 511 and monitoring device 510 may thereafter be used during subsequent lapping to preserve the stripe height of the active devices 524 while leaving a sufficient protection layer, e.g., an insulator material or the like.

In one example, reference device 511 and monitoring device 510 are produced by photolithographic wafer processing similar to active devices 524. In particular, reference device 511 and monitoring device 510 are formed to have the same or similar structure as active readers except for the wafer defined stripe height of monitoring device 510. For example, reference device 511 and monitoring device 510 may be formed on the same level and with the same process steps as readers of active devices 524, thereby reducing or eliminating critical dimension differences associated with different levels. Further, reference device 511 and monitoring device 510 may be disposed adjacent or proximate each end of the active device area, for example, at a pitch similar to active devices 524.

Seen more clearly in FIG. 5B, reference device 511 is formed to have a stripe height equal to or greater than the stripe of active devices 524 plus the desired thickness of the insulator material (not shown). In this particular example, a stripe height of 1.0 μm is shown for illustrative purposes only. Monitoring device 510 is formed similarly or identically to active devices 524 and includes an initial stripe height greater than reference device 511 and active devices 524 (in this example, greater than 1.0 μm). In some examples, reference device 511 is produced with a slightly greater stripe height than the active devices 524 to provide additional budgets for head wear caused by the abrasive tape.

Measurements of monitoring device 510 and reference device 511 may be compared to determine relative stripe heights, and provide an indication of when to cease lapping. Accordingly, monitoring device 510 may be monitored during lapping and stopped using the wafer-defined reference device 511. Lapping may be controlled to within 0.05 μm using a monitoring device 510 and reference device 511 as shown in FIGS. 5A-5C.

FIG. 5C illustrates the exemplary structure post lapping having active devices 524 with wafer defined stripe height and bearing protection features (insulator material not shown). The cluster of active devices 524 may be cut from the substrate and incorporated into a head structure similar to FIG. 2, for example. In one example, monitoring device 510 and reference device 511 remain with active devices 524 after bar cut. In other examples, reference device 511 and/or monitoring device 510 may be cut from the active device region after processing.

In one example, the trackwidth of monitoring device 510 and reference device 511 are equal to or greater than the active readers of active devices 524. This feature may minimize the impact of gauging capability of instruments used in measuring electrical characteristics of the monitoring device 510 and reference device 511. Readers of active devices 524 generally have relatively narrow read trackwidths which often result in low MR resistance values. For example, gauging sensitivity may by improved utilizing a 100 ohm resistor versus a 20 ohm resistor.

It is noted that various other configurations of reference devices and monitoring devices may be utilized to improve device-to-device stripe height uniformity. For example, any number of reference devices and monitoring devices may be used for each cluster of active devices. The reference and monitoring devices may be disposed or intermixed within the active devices. Further, a greater number of monitoring devices could be used than reference devices, or vice versa.

Figure 6:
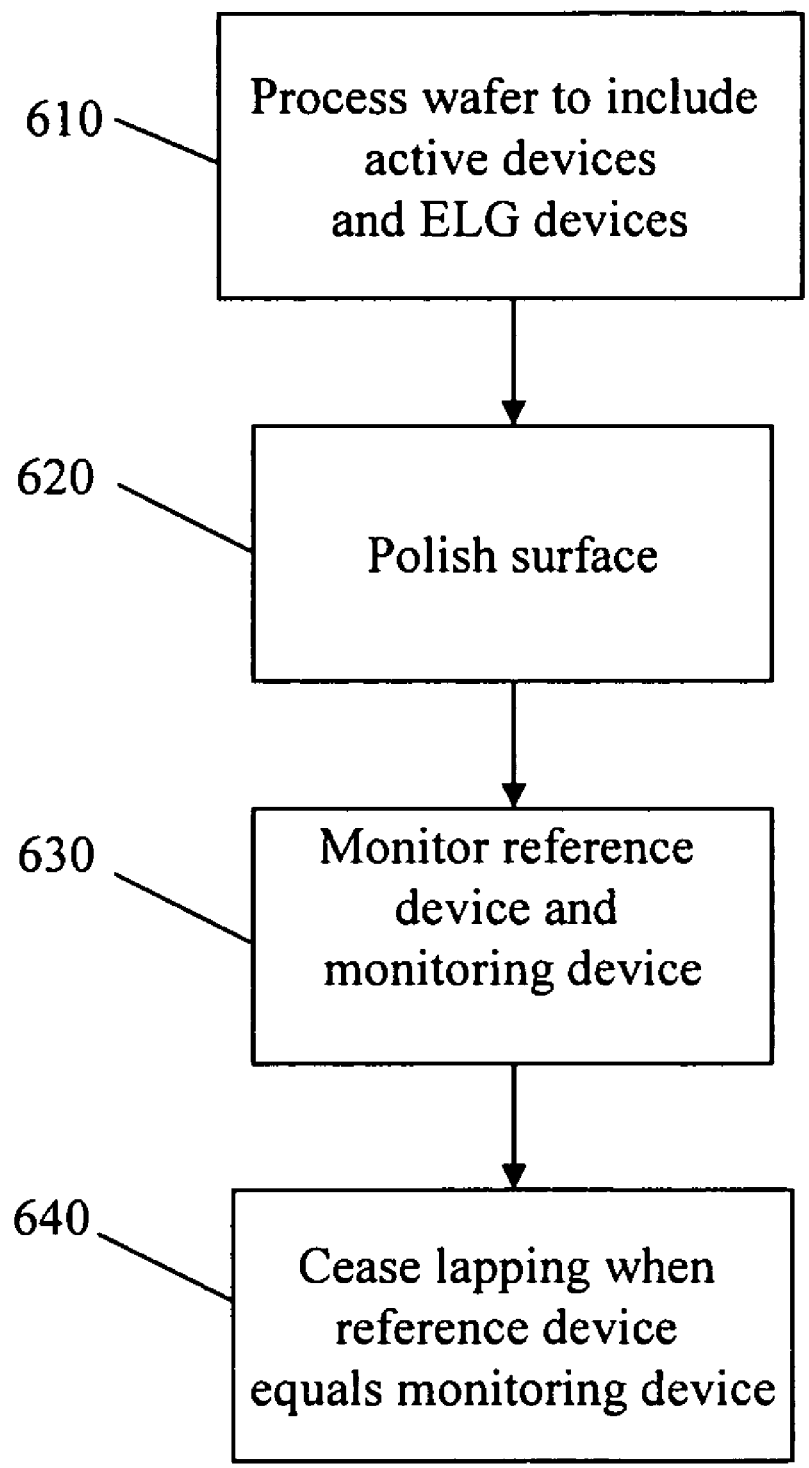
FIG. 6 illustrates an exemplary method for manufacturing a magnetic recoding head including a monitoring device and reference device.

FIG. 6 illustrates an exemplary lapping method using a reference device and monitoring device as described herein, e.g., as shown in FIGS. 5A-5C. In block 610 a wafer is processed to form active devices, e.g., read/write MR sensors arranged in one or more clusters as described. Further, at least one pair of ELG devices including a monitoring device and reference device is formed. Additionally, the wafer may be processed to include conventional ELGs, e.g., such as large and/or small ELGs as described above. The wafer may be manufactured by any suitable wafer processing methods known in the art.

In block 620, the wafer is polished to remove material from the ABS/TBS of the substrate including the active devices and monitoring device(s). A polishing process is performed, e.g., a lapping process or the like, to remove material from the bearing surface and reduce the insulator layer formed over the active devices to a desired thickness as described. In one example, several polishing steps may be used, e.g., a rough polish while monitoring conventional large and/or small ELGs, if present, followed by a fine or smooth polishing to reach a desired bearing surface.

In block 630, the reference device and monitoring device are monitored intermittently or continuously during the one or more polishing steps of block 620. In particular, an electrical characteristic, e.g., the resistance, voltage, or the like, of the reference device and monitoring device are measured and compared. In one example, a test signal is sent through the reference and monitoring device to determine the relative stripe heights. Material is removed from the bearing surface of the substrate until the measured values from the reference device and monitoring device are substantial equal, e.g., until the measured values indicate the stripe heights are equal or within desired tolerances. When the values are substantially equal, the polishing is ceased in block 640 thereby forming the bearing surface at a desired distance from the active devices.

The above detailed description is provided to illustrate various examples and is not intended to be limiting. It will be apparent to those skilled in the art that numerous modification and variations within the scope of the present invention are possible. For example, various MR sensors or devices may be used in a variety of configurations. Further, numerous other materials and processes not explicitly described herein may be used within the scope of the exemplary methods and structures described as will be recognized by those of ordinary skill in the art. Additionally, throughout this description, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claims is:

1. A magnetoresistive read head having a bearing surface for contacting a magnetic storage medium, comprising:
   a magnetoresistive sensor that is disposed between a first read gap layer and a second read gap layer, the magnetoresistive sensor having a slanted surface that faces the bearing surface, the slanted surface including a portion that is nearest the bearing surface; and
   an insulator layer that contacts the slanted surface and is positioned directly between the portion of the magnetoresistive sensor that is nearest the bearing surface and the bearing surface, the insulator layer providing protection for the magnetoresistive sensor from exposure to the bearing surface.

2. The magnetoresistive read head of claim 1, wherein the slanted surface is angled between 5 and 30 degrees.

3. The magnetoresistive read head of claim 1, wherein the insulator layer protects the slanted surface facing the bearing surface from corrosion.

4. The magnetoresistive read head of claim 1, wherein the magnetoresistive sensor is substantially free of oxide encroachment.

5. The magnetoresistive read head of claim 1, wherein the insulator layer is disposed at the same level as the magnetoresistive sensor.

6. The magnetoresistive read head of claim 1, wherein the insulator layer prevents exposure of at least a portion of the magnetoresistive sensor to the bearing surface.

7. The magnetoresistive read head of claim 1, wherein a portion of the magnetoresistive sensor is recessed from the bearing surface by a distance of 750 Å or less.

8. The magnetoresistive read head of claim 1, wherein the insulator layer includes silicon dioxide.

9. The magnetoresistive read head of claim 1, wherein the magnetoresistive sensor is a giant magnetoresistive sensor.

10. The magnetoresistive read head of claim 1, wherein the magnetoresistive sensor is a tunneling giant magnetoresistive sensor.

11. The magnetoresistive read head of claim 1, wherein the magnetoresistive sensor includes an insulator spacer and the insulator spacer is protected from smearing by the insulator layer.

12. The magnetoresistive read head of claim 1, wherein a portion of the magnetoresistive sensor is recessed from the bearing surface by a distance between 100 and 400 Å.

13. The magnetoresistive read head of claim 1, wherein the insulator layer is disposed over the entire slanted surface.

14. A magnetoresistive read head having a bearing surface for contacting a magnetic storage medium, the magnetoresistive read head comprising:
   a magnetoresistive sensor including a slanted surface that faces the bearing surface, the slanted surface including a portion that is nearest the bearing surface; and
   an insulator layer disposed on the slanted surface directly between the portion of the magnetoresistive sensor that is nearest the bearing surface and the bearing surface, the insulator layer extending from the magnetoresistive sensor to the bearing surface.

15. The magnetoresistive read head of claim 14, wherein a portion of the magnetoresistive sensor is recessed from the bearing surface by a distance of greater than 0 Å and less than 750 Å.

16. The magnetoresistive read head of claim 14, wherein the slanted surface is angled approximately between 5 and 30 degrees.

17. The magnetoresistive read head of claim 14, wherein the insulator layer is disposed at the same level as the magnetoresistive sensor.

18. The magnetoresistive read head of claim 14, wherein the magnetoresistive sensor is a giant magnetoresistive sensor.

19. The magnetoresistive read head of claim 14, wherein the magnetoresistive sensor is a tunneling giant magnetoresistive sensor.

20. The magnetoresistive read head of claim 14, wherein the insulator layer is disposed over the entire slanted surface.

* * * * *